Nov. 22, 1932.  D. H. BOTTRILL  1,888,945
WIRE CONNECTING DEVICE
Filed May 18, 1929
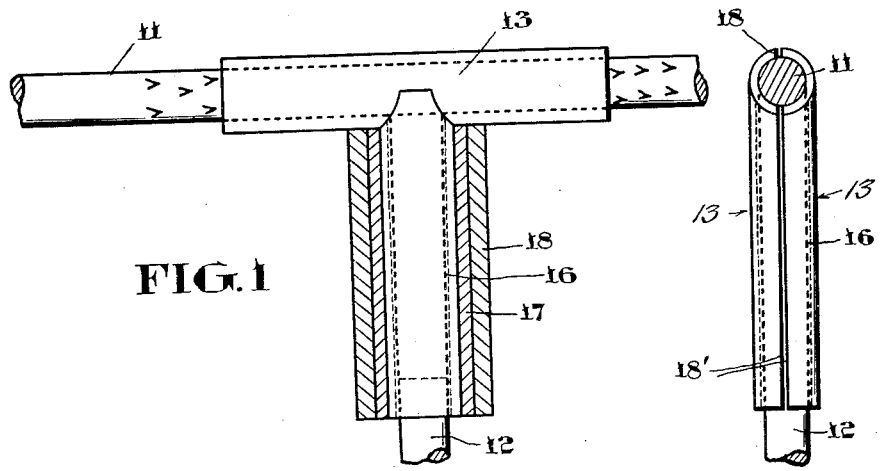
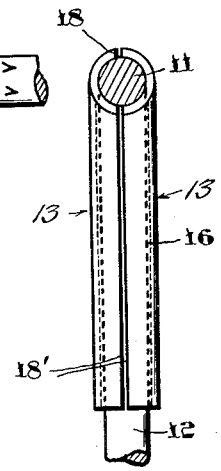
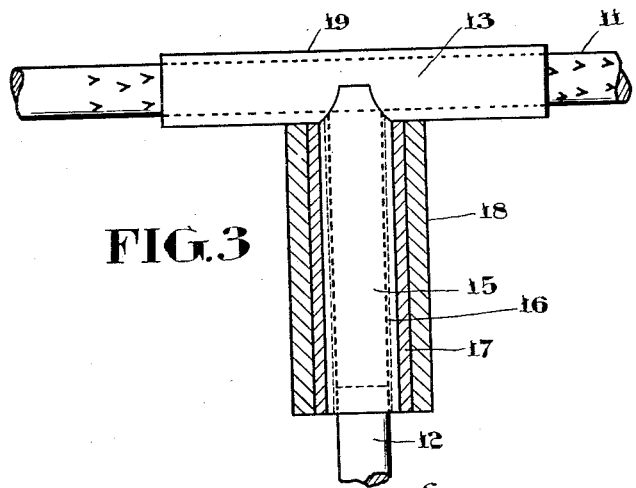
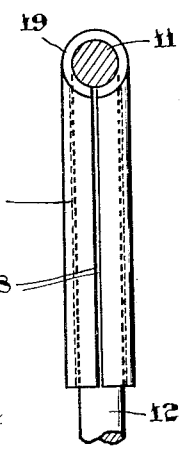
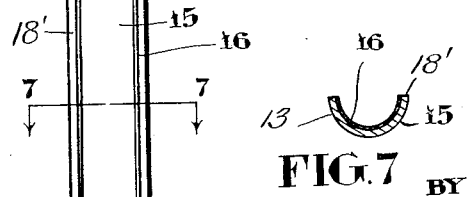
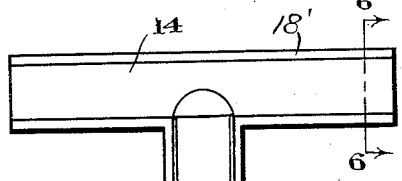
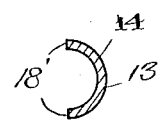
INVENTOR
DAVID. H. BOTTRILL
BY Fetherstonhaugh & Co
ATTORNEYS Patented Nov. 22, 1932

1,888,945

UNITED STATES PATENT OFFICE

DAVID H. BOTTRILL, OF MONTREAL, QUEBEC, CANADA, ASSIGNOR TO THERMWELD LIMITED, OF MONTREAL, QUEBEC, CANADA

WIRE CONNECTING DEVICE

Application filed May 18, 1929. Serial No. 364,300.

This invention relates to connecters and particularly to sleeve connecters in which wires, rods and the like are joined by a soldering operation. The connecter sleeve provided in accordance with this invention is split to provide separate or separable parts. During the soldering operation, these parts are maintained in proper engagement with the elements to be joined by a retaining sleeve fitted thereon. This sleeve carries a body of inflammable heat generating material which is preferably in cohesive engagement with the outer surface of the sleeve. Such material when ignited generates sufficient heat to melt a fusible alloy introduced into the sleeve for the purpose of soldering the sleeve to the elements inserted therein. The connecter sleeve is split principally to facilitate the joining together of angularly related elements, but it will be apparent from the following detailed description that the construction involved embodies certain features capable of wider application.

Iu the drawing which illustrates my invention,

Figure 1 is a side elevation shown partly in section of my improved type of T connector.

Figure 2 is an end view of the connector shown in Figure 1 with the binding sleeve and heat generating unit removed.

Figure 3 is a side elevation shown partly in section of a modified type of T connector made according to my invention.

Figure 4 is a view of the connector shown in Figure 3 with the holding sleeve and heat generating unit removed.

Figure 5 is a side elevation of part of the connector shown in Figure 1.

Figure 6 is a sectional elevation taken on the line 6—6 Figure 5.

Figure 7 is a sectional elevation taken on the line 7—7 Figure 5.

Referring more particularly to the drawing, 11 designates the main line wire of an electric circuit and 12 the branch line which is tapped from the main circuit. In Figures 1 and 2 two half portions 13 of similar shape are used for making the connection. The portions 13 are each made in the manner shown in Figures 5 to 7 inclusive and consists of a main section 14 and an arm section 15 extending outwardly therefrom and preferably intermediate the ends of the main section forming a T. The main section is of semi-circular form and of a diameter approximately the same as the diameter of the wire 11. The arm 15 is also of semi-circular form and is lined with a thin coating 16 of a fusible alloy. The internal diameter between the sides of the alloy lining is slightly less than the diameter of the wire 12. In making the connection, the main sections embrace the main wire and are held in engagement therewith by means of a retaining sleeve 17 which fits tightly over the arm sections to hold their abutting faces 18' together. The outer surface of sleeve 17 carries a surrounding body 18 of inflammable heat generating material in cohesive engagement therewith. The inflammable material 18 is ignited and generates sufficient heat to melt the flux or fusible alloy contained in the arm of the connector. The wire 12 is then pressed into the arm 15 and the molten alloy is distributed through the internal surfaces of the T connector forming an electrical connection between the wires.

In the modification shown in Figures 3 and 4, the connector 19 is made in one piece and is doubled over the main wire as shown in Figure 4. The remaining parts of the device are substantially the same as the parts shown in Figures 1 and 2 and said parts are designated with the same numerals as used in the said figures.

To clamp the connector shown in Figures 3 and 4, the connector is doubled over the main wire until the arm portions are brought into contact. The sleeves are then slipped over the arm, the exo-thermic mixture ignited and the wire 12 pressed into the connector.

It will be seen that the device is inexpensive to manufacture and install and provides a means for making an efficient electrical connection between a main and a branch line with the minimum amount of labor. It will also be evident that connection can be made in very little space and the device is particularly adapted for making connectiòns in conduits or junction boxes of various types.

Having thus described my invention, what I claim is:

A T connection comprising a split tubular connector having a main portion and an angularly disposed arm portion, said arm portion being lined with a fusible alloy and adapted to communicate with the interior of the main portion, a metallic sleeve surrounding the arm portion for clamping the connector to the wire, and a body of heat generating material surrounding said sleeve in heat interchanging relation.

In witness whereof, I have hereunto set my hand.

DAVID H. BOTTRILL.